US011332132B2

(12) United States Patent
Petroff et al.

(10) Patent No.: US 11,332,132 B2
(45) Date of Patent: May 17, 2022

(54) METHOD OF HANDLING OCCLUSIONS AT INTERSECTIONS IN OPERATION OF AUTONOMOUS VEHICLE

(71) Applicant: Argo AI, LLC, Pittsburgh, PA (US)

(72) Inventors: Thomas Petroff, Gibsonia, PA (US); Neal Seegmiller, Pittsburgh, PA (US); Albert Costa, Pittsburgh, PA (US); Christopher Cunningham, Pittsburgh, PA (US); G. Peter K. Carr, Allison Park, PA (US); Sameer Bardapurkar, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 228 days.

(21) Appl. No.: 16/556,321

(22) Filed: Aug. 30, 2019

(65) Prior Publication Data

US 2021/0061269 A1   Mar. 4, 2021

(51) Int. Cl.
*B60W 30/095* (2012.01)
*B60W 30/18* (2012.01)
(Continued)

(52) U.S. Cl.
CPC ........ *B60W 30/0956* (2013.01); *B60W 30/09* (2013.01); *B60W 30/18154* (2013.01);
(Continued)

(58) Field of Classification Search
CPC ............. B60W 30/0956; B60W 30/09; B60W 30/18154; B60W 2554/00;
(Continued)

(56) References Cited

U.S. PATENT DOCUMENTS 9,120,484 B1   9/2015 Ferguson et al.
9,248,834 B1   2/2016 Ferguson et al.
(Continued)

FOREIGN PATENT DOCUMENTS

KR    20190014114 A      2/2019
WO    WO-2019089015 A1 *  5/2019  ......... G06K 9/00805

OTHER PUBLICATIONS

Lee et al., Collision Risk Assessment for Possible Collision Vehicle in Occluded Area Based on Precise Map, Mar. 15, 2018, IEEE (Year: 2018).*

(Continued)

*Primary Examiner* — Dale W Hilgendorf
*Assistant Examiner* — Hana Lee
(74) *Attorney, Agent, or Firm* — Fox Rothschild LLP

(57) ABSTRACT

An autonomous vehicle navigates an intersection in which occlusions block the vehicle's ability to detect moving objects. The vehicle handles this by generating a phantom obstacle behind the occlusion. The vehicle will predict the speed of the phantom obstacle and use the predicted speed to assess whether the phantom obstacle may collide with the vehicle. If a collision is a risk, the vehicle will slow or stop until it confirms that either (a) the phantom obstacle is not a real obstacle or (b) the vehicle can proceed at a speed that avoids the collision. To determine which occlusions shield real objects, the system may use a rasterized visibility grid of the area to identify occlusions that may accommodate the object.

20 Claims, 11 Drawing Sheets

(51) Int. Cl.
*B60W 30/09* (2012.01)
*G08G 1/16* (2006.01)
*G05D 1/00* (2006.01)

(52) U.S. Cl.
CPC ......... *G05D 1/0055* (2013.01); *G05D 1/0088* (2013.01); *G08G 1/166* (2013.01); *B60W 2554/00* (2020.02); *B60W 2720/10* (2013.01); *G05D 2201/0213* (2013.01)

(58) Field of Classification Search
CPC ............ B60W 2720/10; G05D 1/0055; G05D 1/0088; G05D 2201/0213; G08G 1/166
See application file for complete search history.

(56) References Cited

U.S. PATENT DOCUMENTS

| | | | |
|---|---|---|---|
| 9,630,318 B2 | 4/2017 | Ibarz Gabardos et al. | |
| 9,760,092 B2* | 9/2017 | Ferguson | G05D 1/0231 |
| 10,055,850 B2 | 8/2018 | Piekniewski et al. | |
| 2008/0162027 A1* | 7/2008 | Murphy | G05D 1/0274 |
| | | | 701/1 |
| 2014/0288816 A1* | 9/2014 | Hayasaka | B60W 10/18 |
| | | | 701/301 |
| 2016/0176399 A1* | 6/2016 | Takagi | B60W 30/0956 |
| | | | 701/301 |
| 2017/0072962 A1 | 3/2017 | Meyer et al. | |
| 2017/0344855 A1* | 11/2017 | Mande | G06K 9/00785 |
| 2018/0090001 A1 | 3/2018 | Fletcher | |
| 2018/0147988 A1 | 5/2018 | Lee et al. | |
| 2018/0231974 A1* | 8/2018 | Eggert | G05D 1/0088 |
| 2018/0321686 A1 | 11/2018 | Kanzawa et al. | |
| 2018/0374359 A1 | 12/2018 | Li et al. | |
| 2019/0025841 A1 | 1/2019 | Haynes et al. | |
| 2019/0049970 A1 | 2/2019 | Djuric et al. | |
| 2019/0077397 A1 | 3/2019 | Fairfield et al. | |
| 2019/0096255 A1* | 3/2019 | Mills | G01S 17/00 |
| 2019/0384302 A1* | 12/2019 | Silva | G05D 1/0248 |
| 2020/0130685 A1* | 4/2020 | Nguyen | G05D 1/0088 |
| 2020/0225669 A1* | 7/2020 | Silva | G01S 17/89 |

OTHER PUBLICATIONS

Lee, Namhoon et al., DESIRE: Distant Future Prediction in Dynamic Scenes with Interacting Agents, Computer Science: Computer Vision and Pattern Recognition, Apr. 14, 2017.
Deo, N. et al., "Convolutional Social Pooling for Vehicle Trajectory Prediction", cs.CV, May 15, 2018.
Bansal, Mayank et al., "ChauffeurNet: Leaning to Drive by Imitating the Best and Synthesizing the Worst", Computer Science: Robotics, Dec. 7, 2018.
Casas, Sergio et al., "IntentNet: Learning to Predict Intention from Raw Sensor Data", Proceedings of the 2nd Conference on Robot Learning, PMLR 87:947-956, 2018.
Levinson, Jesse et al., "Towards Fully Autonomous Driving: Systems and Algorithms", 2011 IEEE Intelligent Vehicles Symposium (IV), Jun. 5-9, 2011.
Galceran, Enric et al., "Augmented Vehicle Tracking under Occlusions for Decision-Making in Autonomous Driving", 2015 IEEE/RSJ International Conference on Intelligent Robots and Systems (IROS), Sep. 2015.
Chang, Ming-Fang et al., "Argoverse: 3D Tracking and Forecasting with Rich Maps", Jun. 19, 2019.

* cited by examiner

METHOD OF HANDLING OCCLUSIONS AT INTERSECTIONS IN OPERATION OF AUTONOMOUS VEHICLE

BACKGROUND

When an autonomous vehicle (AV) navigates through an environment, it must rely on various sensors to detect objects that are within its vicinity. An autonomous vehicle may use cameras, light detection and ranging (LiDAR) systems, acoustic sensors and/or other sensors to gather this information. However, no matter how many sensors a vehicle uses, no collection of sensors can collect a complete set of information about the environment. For example, AVs often encounter occlusions while navigating in the real world, especially in dense urban areas, and particularly at intersections. Buildings, parked cars and other obstacles can occlude (i.e., block or shield) other moving objects, thus limiting the AV's ability to detect all objects that it are approaching the intersection.

It is not safe to ignore occlusions because moving objects may be hidden behind an occluded area. Nor is it practical to stop all forward progress when an AV encounters an occlusion. Because of these concerns, occlusions can trigger the AV's operating system to require human operator takeover and/or additional stops when the AV approaches the intersection.

This document describes methods and systems that are designed to address at least some of the issues that AVs face when handling occlusions, such as when an AV approaches an intersection.

SUMMARY

In various embodiments an autonomous vehicle navigation system navigates an intersection by determining whether occluded objects are approaching the intersection. The system causes the vehicle to move in a path of travel in a first lane at a speed of travel. When the vehicle detects that an intersection with a second lane is positioned ahead of the vehicle in the path of travel, it will determine a conflict region in the path of travel at the intersection. A conflict region is an area at which the first lane overlaps with the second lane. Before the vehicle reaches the intersection, the system will analyze data collected by the sensors to determine whether the data indicates that an occlusion exists that occludes the sensors' ability to detect whether an object exists in the second lane within a target distance of the intersection. If the processor determines that no occlusion exists, the system will cause vehicle to proceed through the intersection while monitoring the second lane for real obstacles. If the processor determines an occlusion exists, the system will monitor the second lane for potential conflicting obstacles. To do this, the system will: (i) generate a phantom obstacle that is positioned behind the occlusion and that is moving toward the intersection in the second lane; (ii) generate a predicted speed of the phantom obstacle; and (iii) use the predicted speed of the phantom obstacle to determine whether the phantom obstacle is expected to reach the conflict region before the vehicle will pass through the conflict region while continuing to monitor the second lane for obstacles that are approaching the intersection from the conflicting lane. If the phantom obstacle is not expected to reach the conflict region before the vehicle will pass through the conflict region, the system will cause the vehicle to track ahead (continue to move) in the path of travel and into the intersection while continuing to monitor for potential conflicting obstacles in the second lane. If the phantom obstacle is expected to reach the conflict region before the vehicle will pass through the conflict region, the system will instead cause the vehicle to take a safety-related action before permitting the vehicle to enter the intersection.

If the vehicle takes a safety-related action, one such action may include: (i) reducing the speed of the travel of the vehicle; (ii) analyzing new data collected by the sensors to determine whether the data indicates that the occlusion still occludes the sensors' ability to detect whether an object exists in the second lane within a target distance of the intersection; (iii) and repeating the process of generating a phantom obstacle, determining whether the phantom obstacle will reach the intersection before the vehicle will, and tracking ahead until the earlier of (a) the vehicle reaches the conflict line, or (b) the system determines that the phantom obstacle is a real obstacle. Another safety-related action may include: (i) determining that the vehicle can safely pass through the intersection if the vehicle accelerates to an increased speed that is within a speed limit of the path of travel; and (ii) causing the vehicle to pass through the intersection at the increased speed.

In some embodiments, monitoring the conflicting lane for real obstacles includes analyzing additional data collected by the sensors to search for real obstacles in the conflicting lane. Upon identifying that a real obstacle is approaching the intersection in the conflicting lane, the system may determine whether the real obstacle is expected to reach the conflict region before the vehicle will pass through the conflict region. If the real obstacle is expected to reach the conflict region before the vehicle will pass through the conflict region, the system may cause the vehicle to take a safety-related action before permitting the vehicle to enter the intersection.

If the system determines that the phantom obstacle is a real obstacle before the vehicle clears the conflict region, the system may determine whether the real obstacle is expected to reach the conflict region before the vehicle will pass through the conflict region. If the real obstacle is expected to reach the conflict region before the vehicle will pass through the conflict region, the system may cause the vehicle to take a safety-related action.

In some embodiments, the system may determine a stop line position in the path of travel between the autonomous vehicle and the intersection. When the vehicle reaches the stop line, the system may cause the vehicle to either reduce the speed or stop. When the vehicle moves between the stop line and the intersection, the system may limit the speed of travel to a threshold speed.

When generating the phantom obstacle, the system determines whether an occluded object may exist behind the occlusion by: (i) accessing a rasterized visibility grid of the environment; (ii) identifying a plurality of sampling points in the second lane on the rasterized visibility grid; (iii) for each of the sampling points, applying a mask to an area around the sampling point; and (iv) determining whether an occluded object may exist at the sampling point by determining whether all pixels within the mask are occluded. The system may generate the phantom obstacle at any location where the system determined that an occluded object may exist.

Optionally, after applying the mask to the area and before determining whether an occluded object may exist at the sampling point, the system may convolve the mask with the rasterized visibility grid with the mask centered at the sampling point.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

Certain other terms that are relevant to this disclosure are defined at the end of this Detailed Description section.

Figure 1:
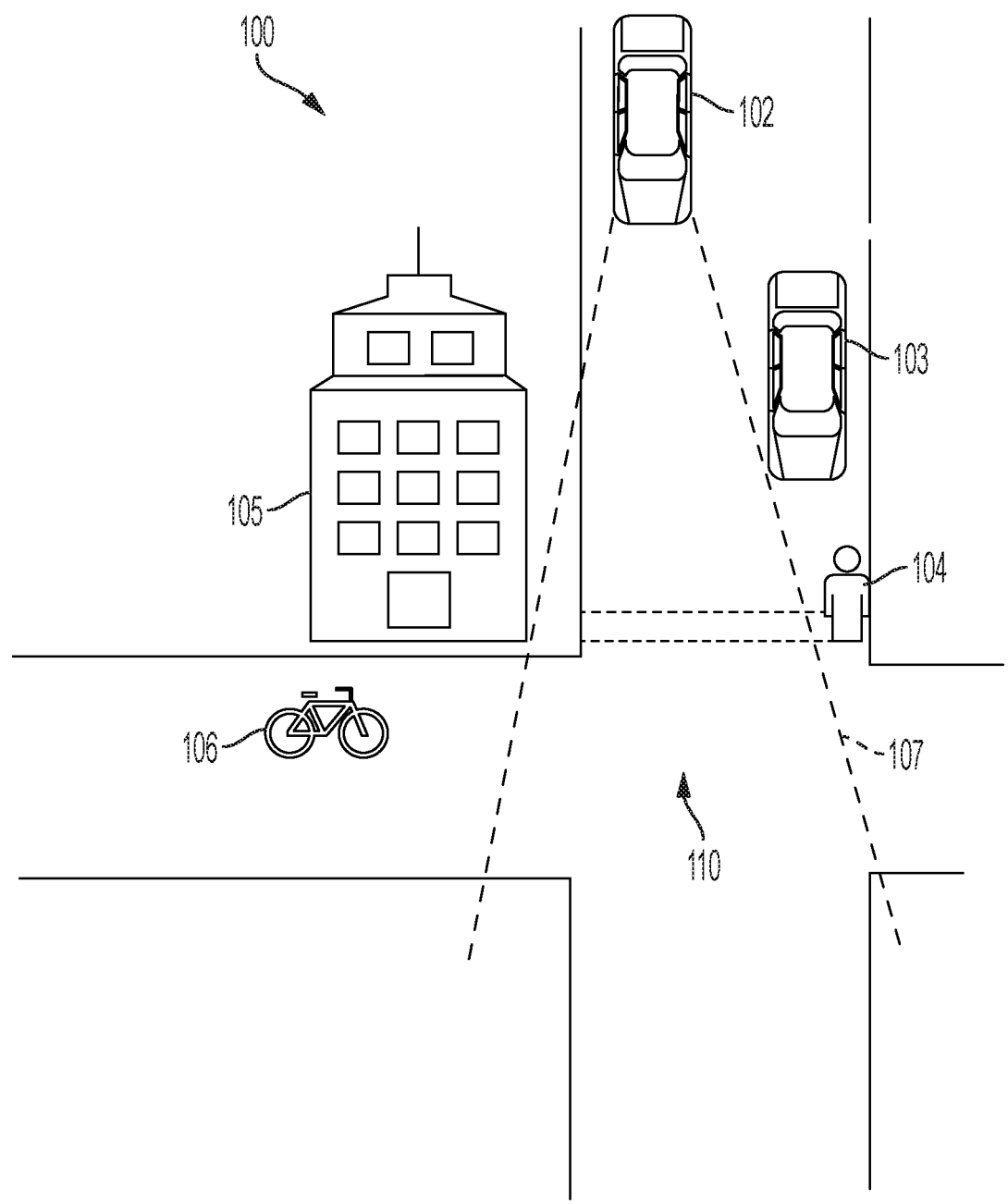
FIG. 1 illustrates an example autonomous vehicle (AV) moving through an environment and approaching an intersection.

FIG. 1 illustrates an example autonomous vehicle (AV) 102 moving through an environment 100 and approaching an intersection 110. Several objects are moving within or near the intersection 110 but occluded from view of the AV 102. For example, a pedestrian 104 is crossing one of the intersection's streets, but another vehicle 103 is positioned between AV 102 and pedestrian 104 and thus occludes the ability of the AV 102 sensors to see beyond an edge of field of view sector 107 detect the pedestrian 104. In addition, a bicycle 106 is approaching the intersection 110, but a building 105 is positioned between AV 102 and the bicycle 106 and thus occludes the ability of the AV 102 sensors to detect the bicycle 106, since the bicycle is beyond the other edge of field of view sector 107. The other vehicle 103 and building 105 are thus occlusions in this example.

Figure 2:
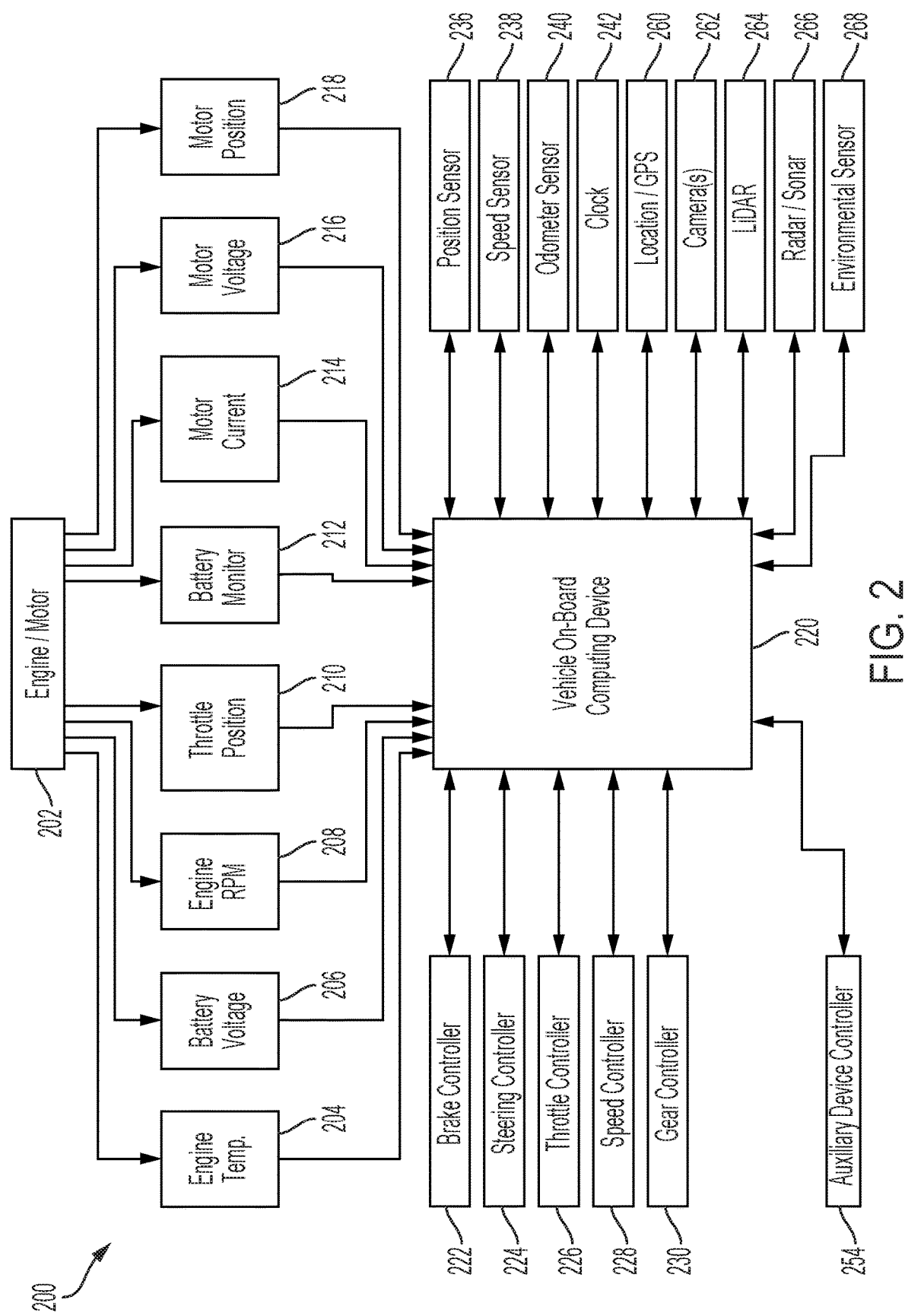
FIG. 2 illustrates example systems and components of an AV.

FIG. 2 illustrates an example system architecture 200 for a vehicle, such as an AV. AV 102 of FIG. 1 can have the same or similar system architecture as that shown in FIG. 2. Thus, the following discussion of system architecture 200 is sufficient for understanding vehicle 102 of FIG. 1.

As shown in FIG. 2, the vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine rotations per minute (RPM) sensor 208, and a throttle position sensor 210. If the vehicle is an electric vehicle or hybrid vehicle then the vehicle may have an electric motor, and accordingly will have sensors such as a battery monitoring system 212 (to measure current, voltage and/or temperature of the battery), motor current 214 and temperature 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The AV also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a global positioning system (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers in a specified time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 3:
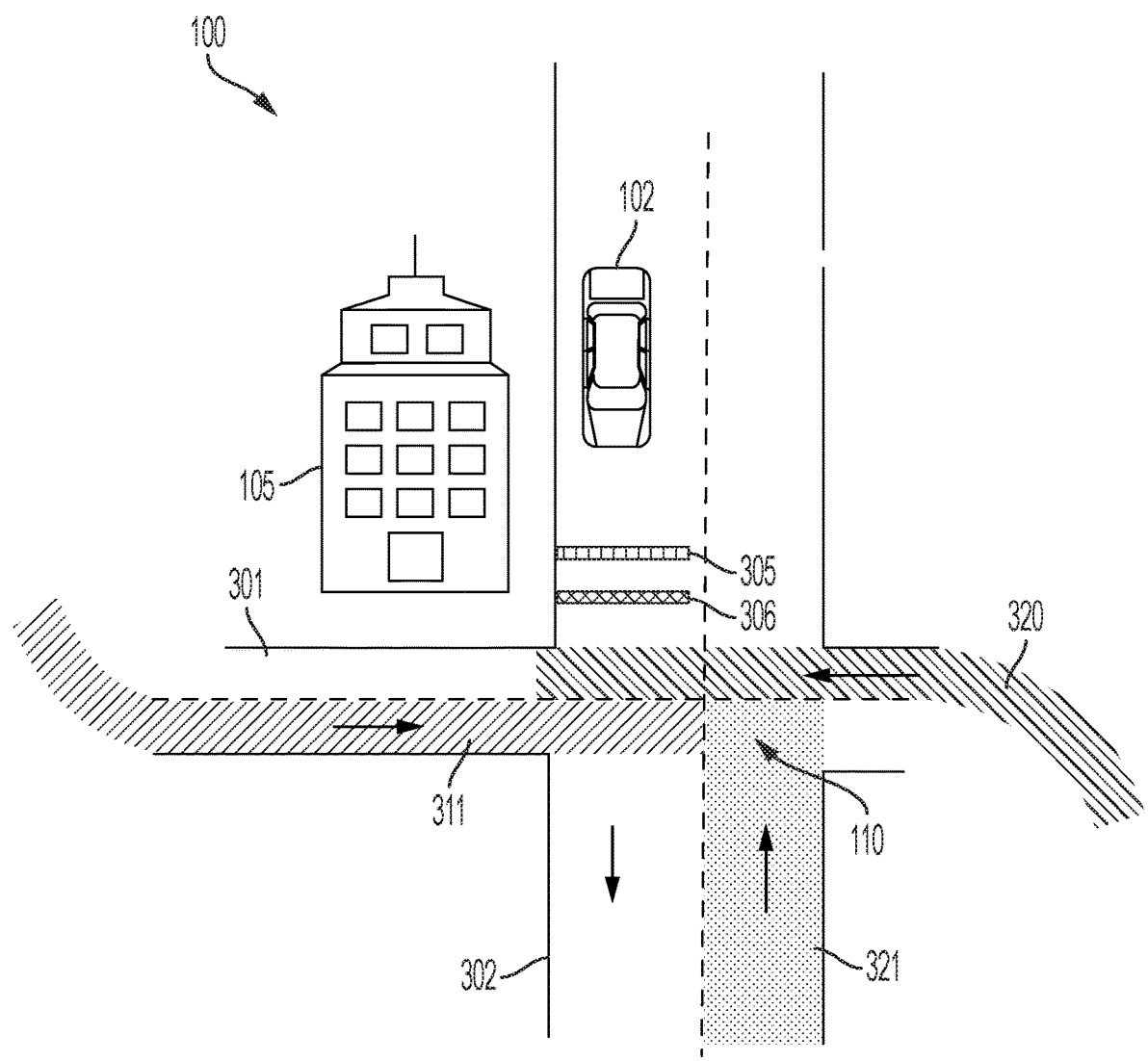
FIG. 3 illustrates a process by which an AV may approach an intersection and evaluate whether occlusions exist that may occlude moving objects that are within minimum distances from the intersection.

FIG. 3 illustrates a method by which a processor that is associated with an AV 102 may make decisions about how the AV should proceed forward when approaching an intersection 110. Each of the two streets 301, 302 that intersect is a two-lane street in this example. The dashed lines represent the boundaries of lanes within each cross street of the intersection 110.

The processor may determine a stop line 305, which is a line at which the AV 102 must stop forward movement before proceeding through the intersection. The processor may determine the stop line 305 by accessing the map data and retrieving the stop line 305 from the map data, or by detecting the starting location of the intersection and setting the stop line 305 at a specified distance from the intersection before the vehicle reaches the intersection. Optionally, the vehicle's rules for operation may require the AV 102 stop at the stop line 305 in all instances (such as if a stop sign is positioned at the intersection 110, in which the rules may include a flag such as "yield to cross traffic" in which the AV must stop until cross traffic is clear, or a "mutual yield" in which the AV will stop until it is the AV's turn to enter the intersection). Alternatively, the vehicle's rules for operation may require the AV 102 to stop at the stop line 305 in some instances (such as if a traffic signal positioned at the intersection 110 has an active red light) but not others (such as if the traffic signal has an active green light).

The processor also may determine a conflict line 306, which is a line at which the lane of the street 302 within which the AV is traveling will begin to overlap with a conflict region in a lane of the intersection's cross street 301 (or another location between the location of the stop line and the point of overlap). As with the location of the stop line, the conflict line and/or conflict region may be included in the map data, or the processor may determine it using captured data such as camera images.

Figure 4:
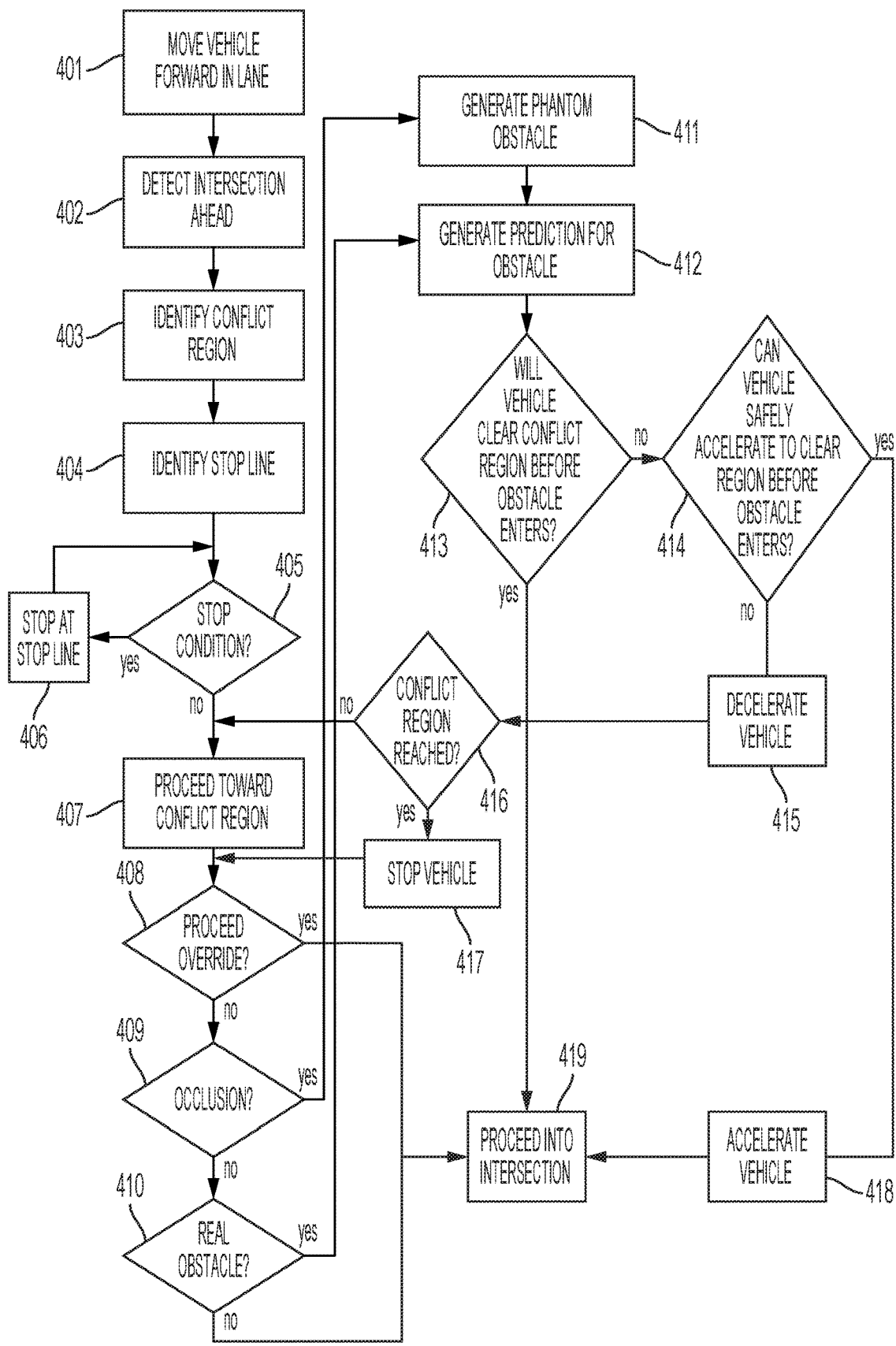
FIG. 4 is a flowchart illustrating the process of FIG. 3.

In a mode of operation, referring to the diagram of FIG. 3 and the flowchart of FIG. 4, a vehicle 102 will move in a path of travel (e.g., in a first lane of a first street 301) at a particular speed of travel (step 401) toward an intersection. An onboard and/or remote processor will detect that an intersection with a second lane is positioned ahead of the autonomous vehicle in the path of travel (step 402). As noted above, the processor may detect the intersection using map data and/or dynamically sensed data. The processor also will determine one or more conflict regions in the path of travel at the intersection (step 403) as noted above, and optionally also a stop line (step 404) before the intersection.

If the processor determines that a stop line position exists in the path of travel between the autonomous vehicle and the intersection, it may determine whether a stop condition exists (step 405). A stop condition may be, for example, that a stop sign is positioned at the intersection, or that a traffic signal at the intersection has an active red light. The system may detect this by receiving the information from camera images and/or map data. If a stop condition exists, the processor may cause the vehicle to stop at the stop line (step 406) until the stop condition is removed. A stop condition may be removed if, for example, a period of time lapses (in the case of a stop sign) or the traffic signal turns to green. If no stop condition exists (either at the outset or after the condition is removed), the processor may permit the vehicle to move past the stop line and toward the conflict region (step 407), and while doing so it may limit the speed of travel of the vehicle to a reduced threshold speed while the vehicle approaches the conflict line.

As the vehicle approaches the intersection, and at any point during this analysis, the system may generate or receive a proceed override command (step 408), which is a command to proceed forward or increase speed and thus override other instructions to stop or slow the vehicle. A proceed override command may be an instruction from a human operator to move forward; or it may be an automatically generated, higher-priority command to move forward due to other detected conditions, with the higher priority resulting from actions such as verified obstacles or collision avoidance maneuvers. If the system receives a proceed override command, the vehicle will continue to move forward into the intersection (step 419).

However, so long as no proceed override command is in effect, the processor will analyze data collected by the sensors to determine whether the data indicates that an occluded object may exist in any of the conflicting routes in the intersection (step 409). Example methods of detecting occlusions will be discussed below in the context of FIGS. 6 through 9B. Conflicting routes are shown by way of example in FIG. 3, in which building 305 occludes the viewable area of route 311 (which is one lane approaching the intersection). Routes 320 and 321 also are lanes that are approaching the intersection, although in the illustration of FIG. 3 no occlusions exist between the vehicle 102 and routes 320 and 321.

Returning to FIG. 4, if no occlusion exists between the vehicle and a target distance from the intersection along any of the intersection's routes, the processor may cause the vehicle to monitor the conflicting lane for real obstacles (step 410) using sensors such as cameras, LiDAR systems and other sensors, and if no real obstacles are within the target distance from the intersection the system may permit the vehicle to proceed into the intersection 419. The target distance is the minimum distance that a moving object traveling at a defined speed can be from the intersection without reaching a conflict region in the intersection before the vehicle travels through the conflicting route location at its current speed. The defined speed may be the speed limit of the conflicting route, or a function of the speed limit of the conflicting route (such as X %, X kilometers per hour, or X miles per hour over the speed limit). For example, the system may calculate the this target distance using a simple equation such as:

$$D_{target} = (D_{vehicle} \times S_{object})/S_{vehicle}$$

where $D_{vehicle}$ is the distance between the vehicle and the conflict region, $S_{vehicle}$ is the current speed of the vehicle, and $S_{object}$ is the defined speed along the conflicting route. Other equations considering additional factors may be used.

Alternatively, if an occlusion is detected within the target distance along any of the route in step 409, the processor may cause the vehicle to generate a phantom obstacle that is positioned behind the occlusion within the intersecting lane and that is moving toward the intersection in the intersecting lane (step 411). The phantom obstacle will be a virtual obstacle that is moving toward the intersection.

If the system generates a phantom obstacle in step 409 or identifies a real obstacle in step 410, the system will generate a predicted speed (step 412) for the obstacle. The predicted speed may be, for example, a speed limit that is assigned to the lane (as retrieved from accessed map data), a default speed (as stored in a rules set) or a speed predicted by any other suitable method.

The system will then use the predicted speed of the obstacle to determine whether or not the obstacle is expected to reach a conflict region in the intersection before the vehicle will clear the conflict region (step 413) at its current speed. The entry point may be a location at which the lane of travel of the obstacle begins to intersect the vehicle's path of travel, a location set at a specified distance before that location, or another suitable location. The point of clearance may be the location at which intersection of the lane of travel and the conflicting lane end, or another suitable location. The system may use this by a straightforward function such as T=D/S, where T=time to intersection, S=speed of travel and D=distance to intersection, and then comparing the T's for each of the vehicle and the phantom or real obstacle to determine which item's T is less (and thus will reach the intersection first). Other calculations also may be used, including trajectory prediction as will be discussed below.

If in step 413 the system determines that the vehicle will clear the conflict region before the obstacle enters it, then the processor may cause the vehicle to track ahead by continuing to move in the path of travel toward or past the conflict region and through the intersection (step 419) while continuing to monitor for any occlusions and potential conflicting obstacles that may be approaching the intersection in the conflicting lane as the vehicle moves forward.

If in step 413 the system determines that the vehicle will not likely clear the conflict region before the obstacle reaches it, the processor may take a safety related action such as decelerate (reduce the speed of travel) of the vehicle (step 415), thus continuing to allow it to move toward the conflict region with less aggressive acceleration, while analyzing new data collected by the sensors to determine whether the data indicates that the occlusion still exists within the target distance from the intersection. If the vehicle reaches the conflict region before confirming that it can clear the region before the obstacle will, it may cause the vehicle to stop (step 417). Otherwise, the system will continue to monitor the intersection for occlusions and real obstacles while tracking forward (steps 409-416)

If the vehicle stops at or before the intersection, the system may wait for a proceed override command (step 408) before proceeding through the intersection. As noted above, a proceed override command may be a manual input by a human operator, a command that is automatically generated after a defined stop time, a command generated after verification of another obstacle checking process, or a command received by other means.

As an optional feature, even if the system determines that a phantom obstacle and/or real obstacle will reach the conflict region before the vehicle clears it, the system may permit the AV to pass through the intersection if it can safely do so by accelerating (step 414). To determine whether the AV can safely pass through first, the system will determine whether the AV can accelerate to a speed that is at or within the speed limit of the AV's lane of travel, using a formula such as T=D/S where S is the applicable speed limit. If this acceleration will allow the AV to pass through the intersection before the phantom or real object will reach the intersection, then as a safety-related action the system may command the AV to accelerate (step 418) and pass through the intersection (step 419) so long as no other potential collisions are detected first.

Even when the vehicle is permitted to pass through into the intersection (step 419) the AV will continue to perform collision checking as it proceeds forward into the intersection using a process such as that illustrated by steps 408-up and/or another suitable process. When doing this, the system may update the target distance to account for the fact that the distance between the AV and the conflict region has been reduced.

Figure 5A:
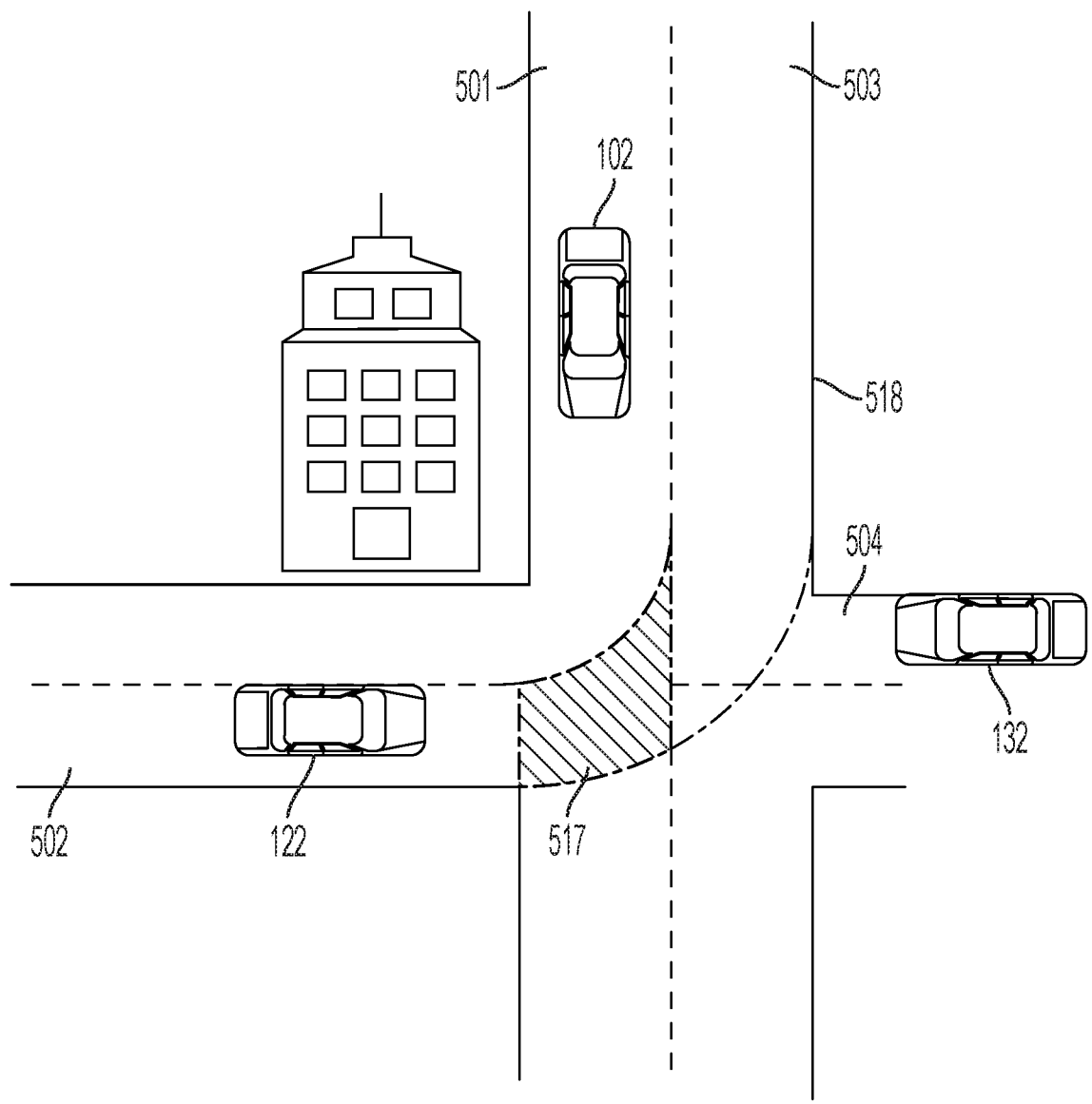
FIGS. 5A and 5B illustrates how the system may operate in an environment in which multiple lanes may intersect at multiple locations, yielding multiple potential conflict regions in the intersection.
Figure 5B:
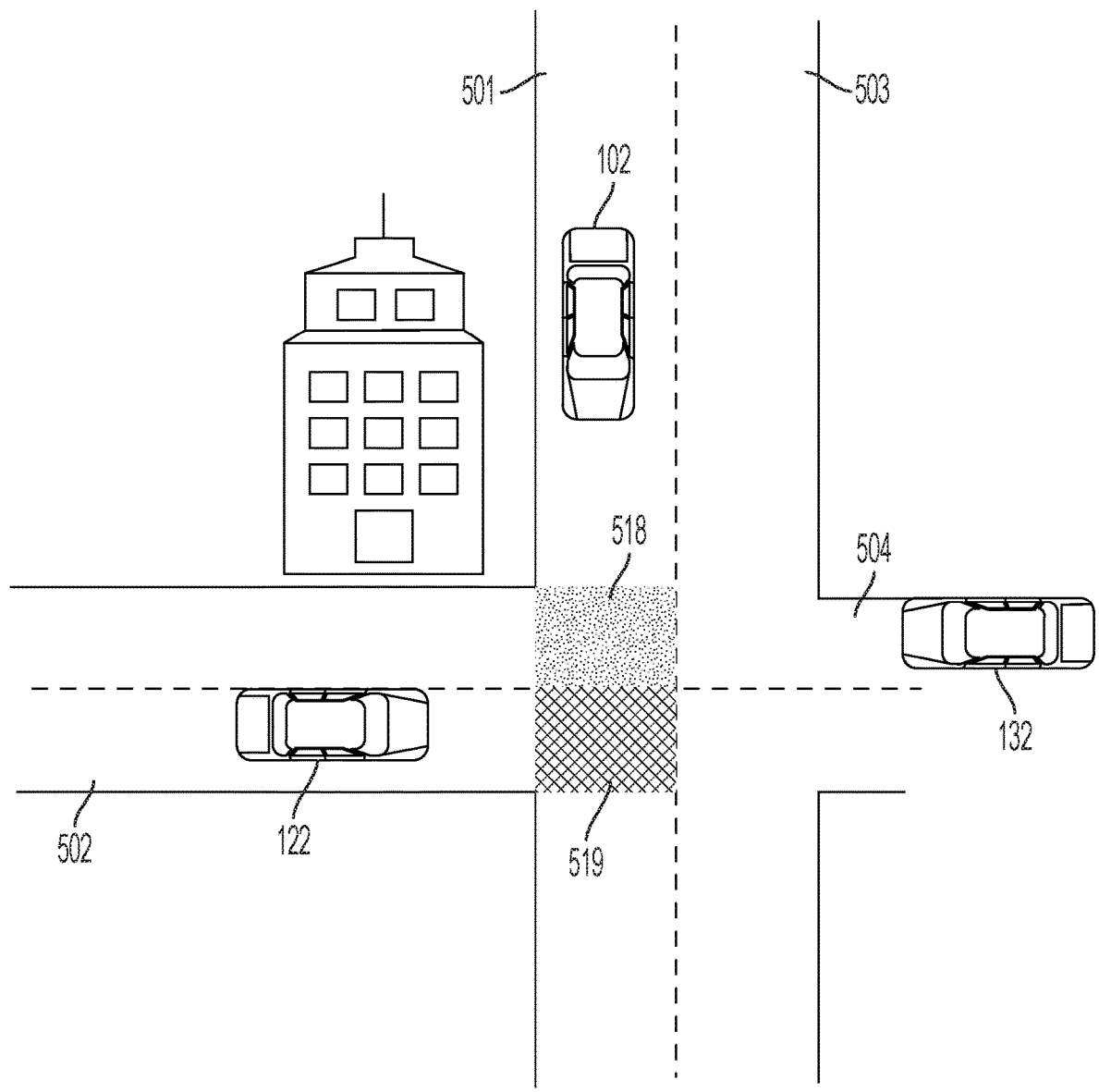

Although the example above discusses a single conflict region, in practice an AV system may consider multiple conflict regions as the vehicle approaches and moves through an intersection. For example, as illustrated in FIGS. 5A and 5B, AV 102 is moving in lane 501. Vehicle 122 is moving in lane 502, which intersects with lane 501. Vehicle 122 could continue to move forward through the intersection in lane 502, or it could make a left turn into lane 503. In addition, vehicle 132 could move into the intersection from lane 504. Thus, in FIG. 5A conflict region 517 represents the area at which lane 501 conflicts with the turning radius of a vehicle from lane 502 turning into lane 503. In FIG. 5B, conflict region 518 represents the area at which lane 501 meets lane 504; while conflict region 519 represents the area at which lane 501 meets lane 502. The system may implement the process for any or all of the conflict regions.

For example, in this situation the target distance from the intersection for conflict region 517 will be a location in lane 502 that approaches the intersection. If only one conflict region existed and the system identified no obstacles or occlusions in within the target distance of the conflicting lane for that region, it would allow the vehicle to proceed forward past conflict region 517 and through the intersection. However, since conflict regions 518 and 519 also exist, the system also may analyze the lanes associated with the other conflict regions before assessing whether and how to proceed. If an occlusion exists within the target distance associated with either of those areas, the system may stop or limit speed of the AV before allowing the AV to pass into the intersection and through conflict region 517. In the example of FIG. 5A, if vehicle 122 is turning left before the AV 102 enters conflict region 517, the system may block the vehicle from entering the intersection until vehicle 122 completes the turn. However, once the AV 102 reaches conflict region 518, turning vehicle 122 can go around AV 102.

As noted above, as the AV moves throughout its path of travel, one or more processors will analyze data collected by various vehicle sensors and use that data to determine whether an occlusion exists. If the system detects no moving objects in conflicting lanes and also no occlusions in target distances from the intersection, it will permit the AV to proceed forward. To do this, the system may use a rasterized visibility map of the intersection and area near the intersection, and it may determine whether occlusions exist in various cells of this visibility map.

Figure 6:
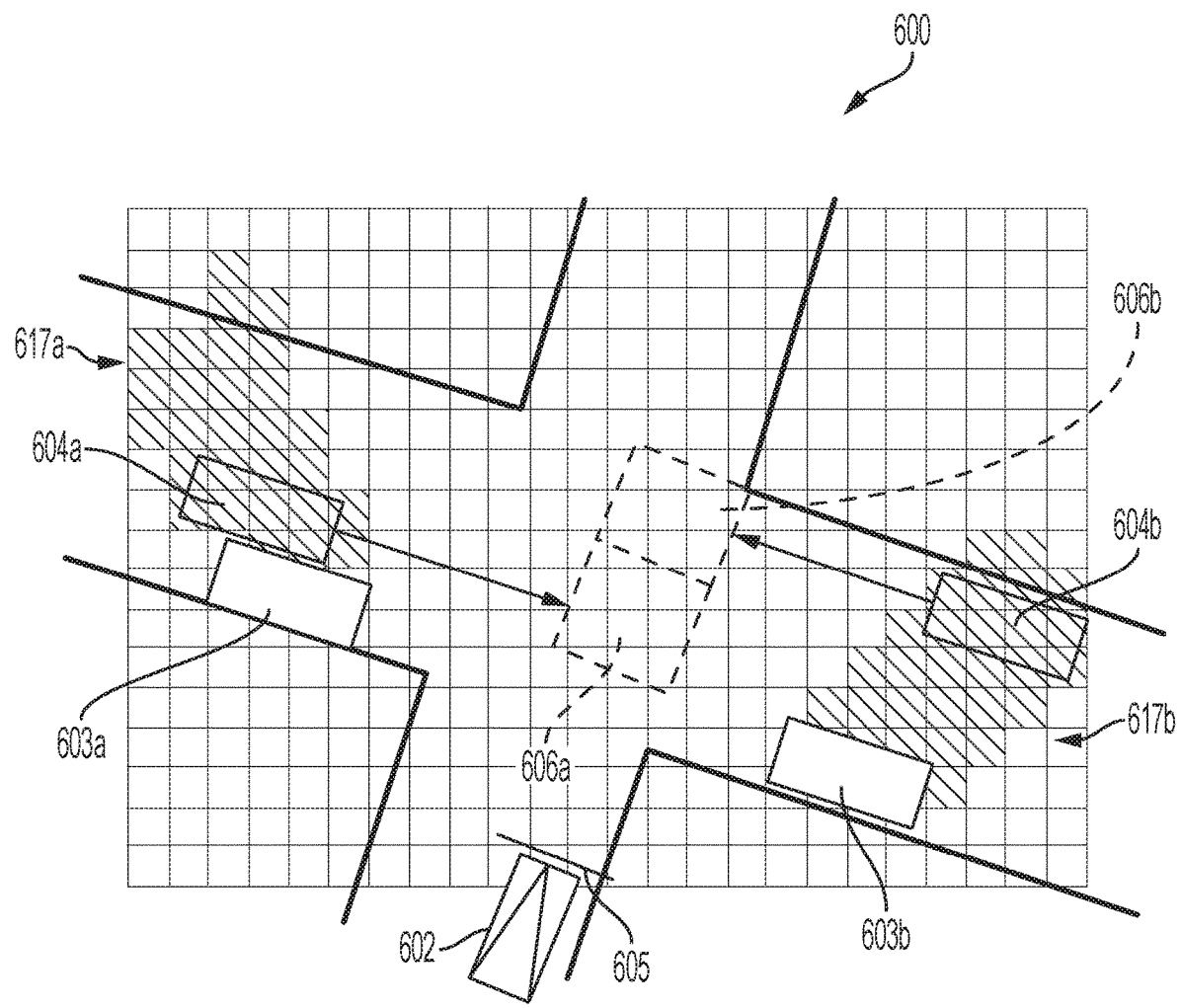
FIG. 6 illustrates a rasterized visibility map of an intersection.

The rasterized visibility map may be part of a data set that integrates geographic map data with sensor information collected from sensors of various AVs as an array of cells. The captured data may span different seasons, weather conditions, and times of day. The sensors used to capture this data may include LiDAR sensors, digital cameras, GPS sensors and/or other sensors. FIG. 6 illustrates a rasterized visibility map 600 of an intersection. In FIG. 6, AV 602 has reached the stop line 605. Because of the occlusions that are parked vehicle 603a and 603b, occluded areas 617a and 617b results in which the AV 602 cannot detect whether an object exists. Thus, the AV may create phantom objects 604a, 604b in each occluded area and identify a predicted speed of travel of each phantom object toward the intersection as discussed above. Conflict line 606a is the location at which the path of travel of AV 602 meets the path of travel of phantom object 604a, while conflict line 606b is the location which the path of travel of AV 602 meets the path of travel of phantom object 604b.

Figure 7:
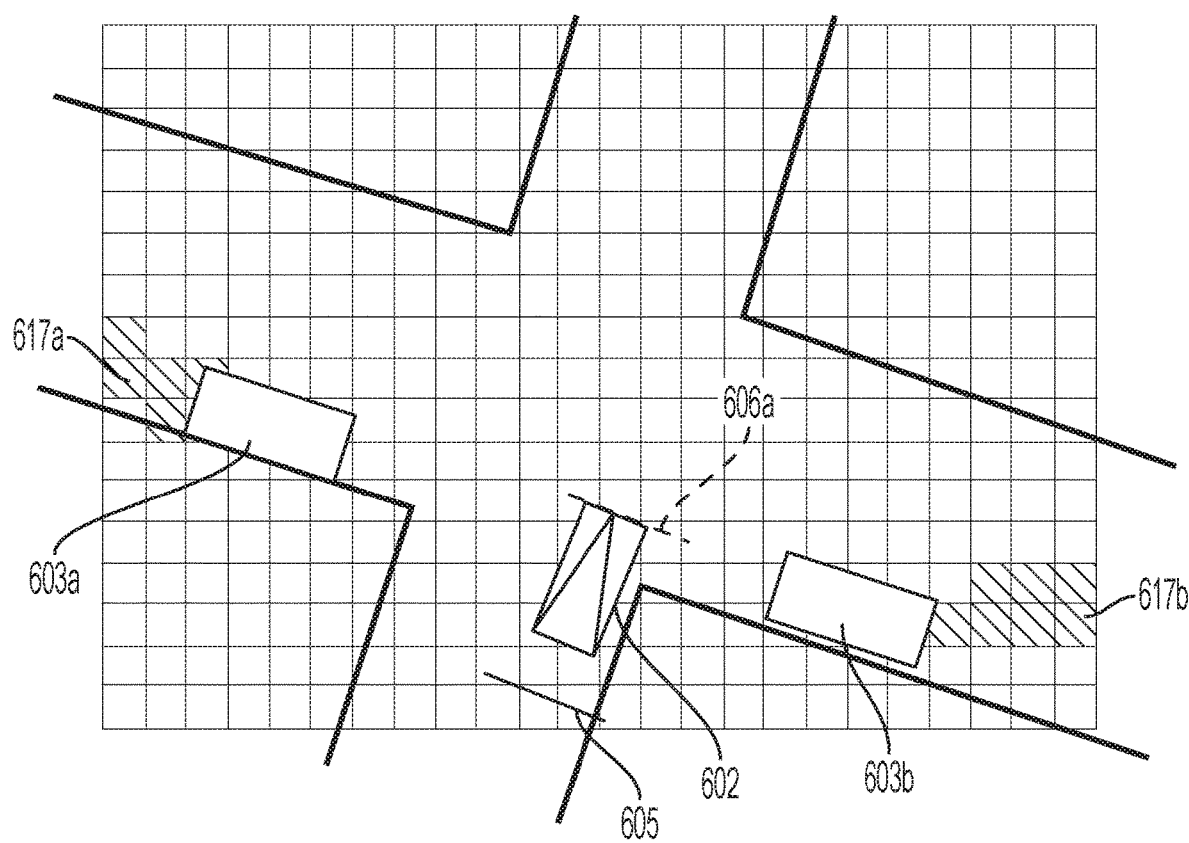
FIG. 7 illustrates how an AV may perceive objects and occluded areas in an intersection when using a rasterized visibility map.

FIG. 7 illustrates what may happen as the AV creeps forward past the stop line 605 toward the conflict lines 606a and 606b. In this situation, the occluded areas 617a, 617b have shifted so that neither occluded area is in a sufficient part of the intersecting lanes to fully block a moving vehicle from detection. In addition, the sensors confirm that no vehicle or other actual object is within the intersecting lanes, so the system will delete the phantom object and no longer consider it. The AV 102 may thus safely pass the conflict line 606a and into the intersection.

Figure 8A:
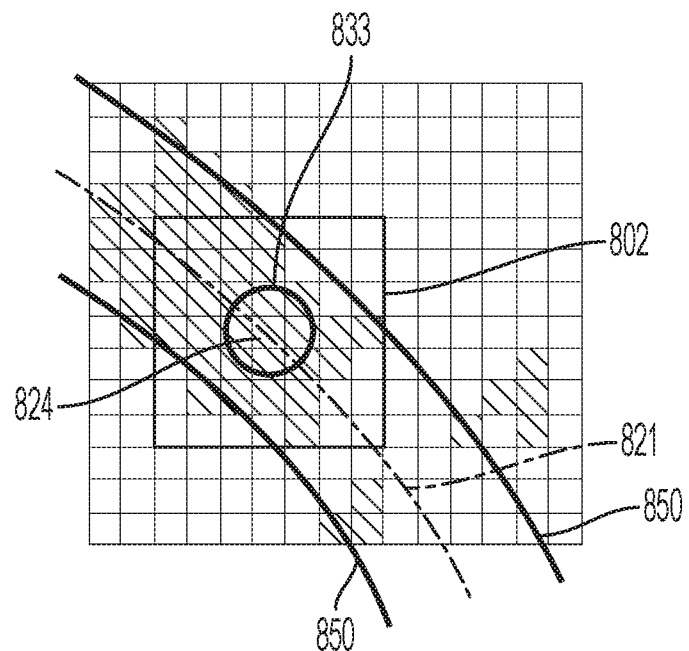
FIGS. 8A and 8B illustrates how a system may erode a rasterized visibility map into a format that identifies occluded areas that are candidate locations for occluded objects.
Figure 8B:
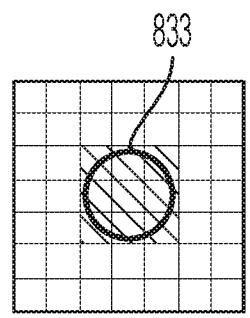
Figure 9A:
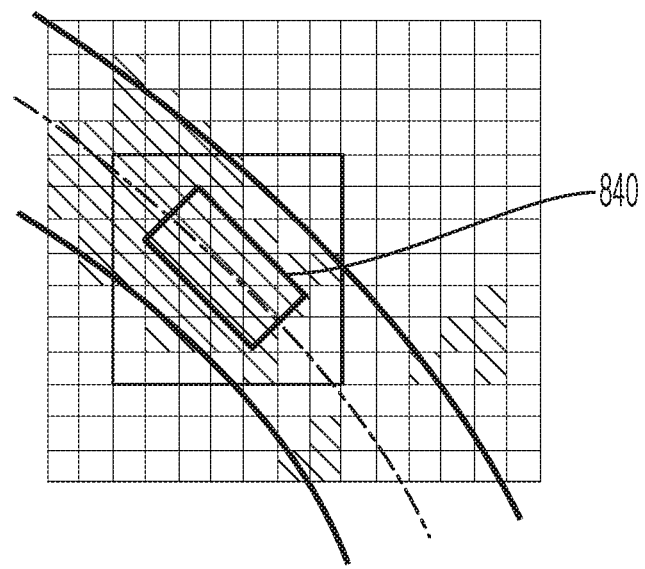
FIGS. 9A and 9B illustrate a variation of the process shown in FIGS. 8A and 8B with a mask of a different shape.
Figure 9B:
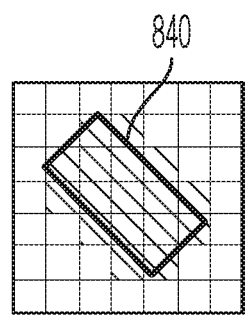

To identify whether to add phantom objects to the visibility map, the system may convert the rasterized visibility map into a binary image in which occluded cells have a value of 1 and all other cells have a value of zero (or vice versa), and it may then use the binary image to detect occluded objects in the resulting grid. By way of example, in FIG. 8A all occluded cells in a rasterized visibility grid 802 of an area around a sampling point 824 are shown with shading. When the system identifies conflicting routes in an intersection, it will sample areas around multiple such points along the centerline 821 of the route, traversing backwards (away) from the intersection. At each sampled point (e.g., 824), the system will determine whether an occluded object may be present at the sample point. The system will compute a mask for an object shape at the sample point 824. The mask may be a circular mask 833 as shown in FIG. 8A. Alternatively, FIG. 9A illustrates that the mask may be an oriented bounded box 840 with an orientation aligned with the orientation of the lane. Referring to both FIGS. 8A and 9A, the system will convolve the mask (833 or 840) with the visibility grid (802 or 812), with the mask centered at the sample point (824 or 834). The system will then analyze the result of the convolution. If all masked pixels (i.e., pixels within mask 833 or 840) in the result are occluded (as shown in FIGS. 8B and 9B), the system will generate a phantom object at the sample point.

The use of a mask enables the system to choose a mask that is of sufficient size and shape to accommodate the phantom obstacle. Thus, if all pixels in the mask are not occluded, the system may not determine that an actual object exists in the occluded area.

To determine the location of a phantom object in the occluded area of the eroded image, the system may traverse the centerline of each lane segment in the occluded area from end to start, sampling points as using a process such as is described above. The system will repeat this process for multiple sampling locations along centerline 821. When the object mask is symmetric (such as mask 833 in FIGS. 8A and 8B, the system may use the mask as a structuring element to erode the visibility grid, and it would not be necessary to convolve the mask with the visibility grid; instead, the system may only check individual pixels at the various sampling points. In addition, instead of using a centerline 821, the system may apply this process to other sampling points that are within the boundaries 850 of the lane segments along the conflicting route. If so, then to determine which location the phantom object should be placed the system may place a potential phantom object at each candidate sampled location (i.e., each location in which all masked pixels are occluded), and may select the location of the phantom object as that which is closest to the centerline 821.

To predict the trajectory of a phantom object, the system may use an algorithm such as that described above, or it may use other motion prediction algorithms such as those that consider the location of the object within a lane (i.e., its location with respect to the lane's centerline), the pose of the object, and/or other information.

Figure 10:
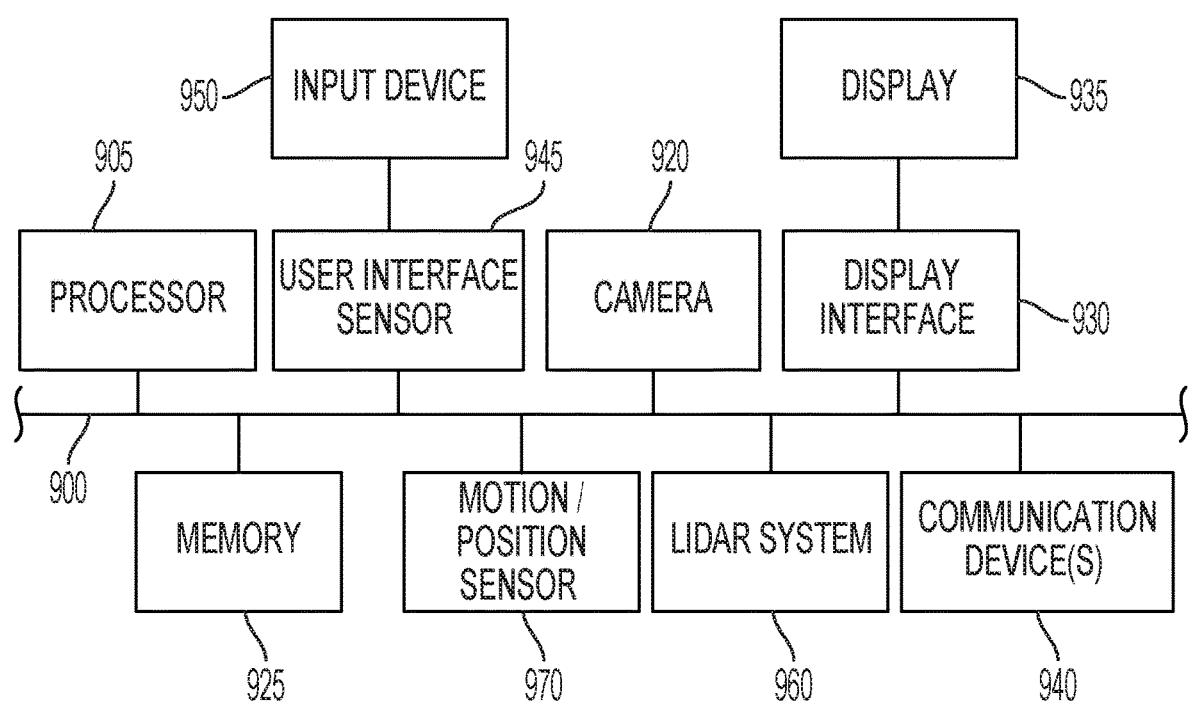
FIG. 10 illustrates various elements of a possible electronic subsystem of an AV and/or external electronic device.

FIG. 10 depicts an example of various hardware elements that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "computer" or "computing device" is an electronic device having one or more processors. An "on-board computing device" is a computing device that is a component of a vehicle that is used to control operations of one or more components of the vehicle.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of navigating an autonomous vehicle through an intersection, the method comprising:
by a processor that is controlling operation of one or more systems of a vehicle having a plurality of sensors that are configured to detect objects in an environment of the vehicle:
causing the vehicle to move in a path of travel in a first lane at a speed of travel;
detecting that an intersection with a second lane is positioned ahead of the autonomous vehicle in the path of travel;
identifying a conflict region in the path of travel at the intersection, wherein the conflict region comprises an area in which the first lane overlaps with the second lane; before the vehicle reaches the intersection, analyzing data collected by the sensors to determine whether the data indicates that an occlusion exists that occludes the sensors' ability to detect whether an object exists in the second lane within a target distance of the intersection;
in response to determining that no occlusion exists, causing the vehicle to proceed through the intersection while monitoring the conflicting lane for real obstacles;
in response to determining that an occlusion exists:
accessing a rasterized visibility grid of the environment;
applying a mask to an area around each of one or more sampling points in the second lane on the rasterized visibility grid; and
in response to all pixels within the mask being occluded:
generating a phantom obstacle at a sampling point corresponding to the occluded pixels, the phantom obstacle moving toward the intersection in the second lane,
generating a predicted speed of the phantom obstacle, and
using the predicted speed of the phantom obstacle to determine whether the phantom obstacle is expected to reach the conflict region before the vehicle will pass through the conflict region;
when the phantom obstacle is not expected to reach the conflict region before the vehicle will pass through the conflict region, causing the vehicle to continue to move in the path of travel and into the intersection; and when the phantom obstacle is expected to reach the conflict region before the vehicle will pass through the conflict region, taking an action before permitting the vehicle to enter the intersection.

2. The method of claim 1, wherein taking the action comprises:
reducing the speed of the travel of the vehicle;
analyzing new data collected by the sensors to determine whether the data indicates that the occlusion still occludes the sensors' ability to detect whether an object exists in the second lane within a target distance of the intersection; and
continuing to monitor for potential conflicting obstacles in the second lane until the earlier of (a) the vehicle reaches the conflict region, or (b) the processor determines that the phantom obstacle is a real obstacle.

3. The method of claim 1, wherein taking the action comprises:
causing the vehicle to pass through the intersection at an increased speed in response to determining that accelerating to a speed that is within a speed limit of the path of travel will cause the vehicle to pass through the intersection before the phantom obstacle reaches the intersection.

4. The method of claim 1, wherein monitoring the conflicting lane for real obstacles comprises:
analyzing additional data collected by the sensors to search for real obstacles in the conflicting lane;
upon identifying that a real obstacle is approaching the intersection in the conflicting lane, determining whether the real obstacle is expected to reach the conflict region before the vehicle will pass through the conflict region; and
when the real obstacle is expected to reach the conflict region before the vehicle will pass through the conflict region, taking a second action before permitting the vehicle to enter the intersection.

5. The method of claim 1 further comprising, by the processor:
in response to determining that the phantom obstacle is a real obstacle before the vehicle clears the conflict region:
determining whether the real obstacle is expected to reach the conflict region before the vehicle will pass through the conflict region, and
when the real obstacle is expected to reach the conflict region before the vehicle will pass through the conflict region, taking a second action.

6. The method of claim 1 further comprising, by the processor:
when the autonomous vehicle reaches a stop line, causing the vehicle to either stop or reduce the speed of travel; and
when the vehicle moves between the stop line and the intersection, limiting the speed of travel to a threshold speed.

7. The method of claim 1, wherein generating the phantom obstacle further comprises generating the phantom obstacle at any location at which the system determines that an occluded object may exist.

8. The method of claim 1, further comprising computing the mask based on an obstacle shape or size.

9. The method of claim 1, wherein the mask is an oriented bounded box with an orientation aligned with the orientation of the second lane.

10. The method of claim 1, wherein identifying the plurality of sampling points in the second lane comprises identifying the plurality of sampling points along a centerline of the second lane.

11. The method of claim 1, generating the phantom obstacle comprises generating the phantom obstacle centered at the sampling point corresponding to occluded pixels.

12. A navigation system for an autonomous vehicle, the system comprising:
a processor;
a plurality of sensors that are configured to detect objects in an environment of a vehicle; and
a computer-readable medium containing programming instructions that are configured to instruct the processor to navigate the vehicle through an intersection by:
causing the vehicle to move in a path of travel in a first lane at a speed of travel,
detecting that an intersection with a second lane is positioned ahead of the autonomous vehicle in the path of travel,
identifying a conflict region in the path of travel at the intersection, wherein the conflict region comprises an area in which the first lane overlaps with the second lane,
before the vehicle reaches the intersection, analyzing data collected by the sensors to determine whether the data indicates that an occlusion exists that occludes the sensors' ability to detect whether an object exists in the second lane within a target distance of the intersection,
in response to determining that no occlusion exists, causing the vehicle to proceed through the intersection while monitoring the second lane for real obstacles,
in response to determining that an occlusion exists:
accessing a rasterized visibility grid of the environment;
applying a mask to an area around each of one or more sampling points in the second lane on the rasterized visibility grid; and
in response to all pixels within the mask being occluded:
generating a phantom obstacle at a sampling point corresponding to the occluded pixels, the phantom obstacle moving toward the intersection in the second lane;
generating a predicted speed of the phantom obstacle; and
using the predicted speed of the phantom obstacle to determine whether the phantom obstacle is expected to reach the conflict region before the vehicle will pass through the conflict region,
when the phantom obstacle is not expected to reach the conflict region before the vehicle will pass through the conflict region, causing the vehicle to continue to move in the path of travel and into the intersection, and
when the phantom obstacle is expected to reach the conflict region before the vehicle will pass through the conflict region, taking an action before permitting the vehicle to enter the intersection.

13. The system of claim 12, wherein the instructions to take the action comprise instructions to:
reduce the speed of the travel of the vehicle;
analyze new data collected by the sensors to determine whether the data indicates that the occlusion still occludes the sensors' ability to detect whether an object exists in the second lane within a target distance of the intersection; and continuing to monitor for potential conflicting obstacles in the conflicting lane until the earlier of (a) the vehicle reaches the conflict region, or (b) the processor determines that the phantom obstacle is a real obstacle.

14. The system of claim 12, wherein the instructions to take the action comprise instructions to:

cause the vehicle to pass through the intersection at an increased speed in response to determining that accelerating to a speed that is within a speed limit of the path of travel will cause the vehicle to pass through the intersection before the phantom obstacle reaches the intersection.

15. The system of claim 13 wherein the instructions that are configured to instruct the processor to monitor the second lane for real obstacles comprise instructions to:

analyze additional data collected by the sensors to search for real obstacles in the second lane;

upon identifying that a real obstacle is approaching the intersection in the second lane, determine whether the real obstacle is expected to reach the conflict region before the vehicle will pass through the conflict region; and when the real obstacle is expected to reach the conflict region before the vehicle will pass through the conflict region, take a second action before permitting the vehicle to enter the intersection.

16. The system of claim 12 further comprising additional instructions that are configured to instruct the processor to:

in response to determining that the phantom obstacle is a real obstacle before the vehicle clears the conflict region:

determining whether the real obstacle is expected to reach the conflict region before the vehicle will pass through the conflict region, and when the real obstacle is expected to reach the conflict region before the vehicle will pass through the conflict region, taking a second action.

17. The system of claim 12 further comprising additional instructions that are configured to instruct the processor to:

when the vehicle reaches a stop line, cause the vehicle to either stop or reduce the speed of travel; and when the vehicle moves between the stop line and the intersection, limit the speed of travel to a threshold speed.

18. The system of claim 12, wherein the instruction to generate the phantom obstacle further comprise instructions to generate the phantom obstacle at any location where the system determines that an occluded object may exist.

19. A computer program product for navigating a vehicle through an intersection, the product comprising programming instructions stored on a non-transitory computer-readable medium, wherein the instructions are configured to instruct a processor of the vehicle to navigate the vehicle through an intersection by:

causing the vehicle to move in a path of travel in a first lane at a speed of travel, detecting that an intersection with a second lane is positioned ahead of the vehicle in the path of travel;

identifying a conflict region in the path of travel at the intersection, wherein the conflict region comprises an area in which the first lane overlaps with the second lane;

before the vehicle reaches the intersection, analyzing data collected by one or more sensors of the vehicle to determine whether the data indicates that an occlusion exists that occludes the one or more sensors' ability to detect whether an object exists in the second lane within a target distance of the intersection;

in response to determining that no occlusion exists, causing the vehicle to proceed through the intersection while monitoring the second lane for real obstacles;

in response to determining that an occlusion exists:

accessing a rasterized visibility grid of the environment;

identifying a plurality of sampling points in the second lane on the rasterized visibility grid;

applying a mask to an area around each of one or more sampling points; and in response to all pixels within the mask being occluded:

generating a phantom obstacle at a sampling point corresponding to the occluded pixels, the phantom obstacle moving toward the intersection in the second lane, generating a predicted speed of the phantom obstacle, and using the predicted speed of the phantom obstacle to determine whether the phantom obstacle is expected to reach the conflict region before the vehicle will pass through the conflict region;

when the phantom obstacle is not expected to reach the conflict region before the vehicle will pass through the conflict region, causing the vehicle to continue to move in the path of travel and into the intersection; and when the phantom obstacle is expected to reach the conflict region before the vehicle will pass through the conflict region, taking an action before permitting the vehicle to enter the intersection.

20. The computer program product of claim 19, wherein the instructions to take the action comprise instructions to:

when the vehicle can pass through the intersection if the vehicle accelerates to an increased speed that is within a speed limit of the path of travel, cause the vehicle to pass through the intersection at the increased speed; and when the vehicle reaches the conflict region before the processor determines that the phantom obstacle is a real obstacle, cause the vehicle to pass through the conflict region.

* * * * *